3,019,140
DESIZING PROCESS

William Kilby, Lancaster, and Wilfred Arthur Stephen White, Liverpool, England, assignors, by mesne assignments, to Imperial Chemical Industries Limited, Millbank, London, England, a corporation of Great Britain
No Drawing. Filed Sept. 10, 1957, Ser. No. 683,017
Claims priority, application Great Britain Sept. 13, 1956
9 Claims. (Cl. 134—30)

This invention relates to an improved process of desizing textile fibres and filaments made from glass or other mineral fibres and likewise materials such as strands, yarns, cords, roving, matting and woven or knitted fabrics made from such mineral fibres and filaments.

In the production of glass fibres and filaments intended for spinning and doubling into yarns and likewise in the subsequent weaving or knitting of the yarn into fabric it is essential that the fibres, filaments and yarns be coated with a size which binds the individual fibres together, protects them from abrasion and also acts as a lubricant. Such sizes are customarily compounded of such materials as resins, gums, starches and emulsified oils, the precise nature and proportions of the various ingredients used varying from one manufacturer to another. Frequently, however, when the size has served its purpose of protecting the fibres during spinning, weaving knitting or other mechanical operations it must be removed before the fabric can be used to serve its ultimate purpose.

For instance, a growing use for woven glass fabrics is to provide a reinforcing network in laminated plastics; the fabric is virtually embedded in and forms a reinforcing core for the resin, usually a polyester or epoxy resin or less frequently a phenolic or melamine-formaldehyde resin. A bonding agent is usually applied to the glass before it is treated with the resin. For certain applications of such laminated plastics, particularly in the aircraft industry, it is imperative to secure virtually complete removal of the size from the fabric before application of the bonding agent and impregnation with the resin—otherwise the resin does not properly adhere to the glass fabric and the composite plastic structure lacks strength and is otherwise unsatisfactory. Another case where complete removal of size is imperative is with glass tapes that are coated or varnished and used for insulation in the electrical industry.

Experience has shown that satisfactory removal of the size from the glass fibres, filaments, yarns and fabrics is not easily achieved. Attempts have been made hitherto to remove the size by burning it off, by solvent treatment, by washing in aqueous solutions containing urea or alkali or soap or other detergent and by combinations of such processes. Some of these treatments do not adequately remove the size; others, though fairly successful in that respect, deleteriously affect the fabric in other ways. For instance, treatments with caustic alkalies are undesirable in that they appear to degrade the glass and/or lead to some absorption of alkali by the glass which interferes with its subsequent use; usually the glass is weakened, adhesion of the resin is imperfect and the strength of the resulting laminate is seriously impaired.

By reason of the defects of such chemical desizing methods as have been hitherto available, the chief method currently in use is heat cleaning, i.e. burning off the size. Obviously temperature control is very important with this process, but in fact adequate temperature control is very difficult to achieve and in practice one frequently finds that if the residual organic matter is brought down to an acceptable figure the strength of the glass is impaired, whereas if strength is conserved, the percentage of residual organic matter is undesirably high, Moreover the heating period is inconveniently long so that the process has usually to be worked as a batch process. Some success has recently been attained with a process that combines a preliminary aqueous detergent treatment with a final heat cleaning at a temperature lower than that conventionally used for burning off the size. However the plant is expensive and bulky and the process is not easily adapted to be run continuously.

We have now found, surprisingly, that a very simple, rapid and continuous treatment based primarily on solvent extraction and simple hot water washing will suffice to remove, not only the oily and resinous constituents of the size, but also the starchy and gummy matters and thus reduce the residual organic matter to an acceptable figure.

Our process comprises treating the sized materials for a period not exceeding 30 minutes with trichloroethylene or perchloroethylene, optionally providing an opportunity for solvent to drain or be expressed or evaporated from the materials and then treating the materials with hot water until their residual organic content reaches the desired figure.

In its preferred embodiment our process can continuously treat a woven fabric at open width on a small compact plant at such a speed that the total treatment time for any given portion of the fabric can be as short as 2 minutes.

The most convenient way of treating the materials with the liquids specified is, of course, to immerse them therein but other methods, such as spraying, may be used, if desired, provided they result in the materials becoming thoroughly soaked or impregnated with the liquid.

Conveniently we combine two features of the process by draining off or mechanically expressing the bulk of the solvent and then utilising the hot water treatment to complete the elimination of that which remains. In this embodiment of the process such solvent as still remains entrained in the material is removed by "flash evaporation," that is by treating it with water held at such a temperature as leads to rapid and virtually complete evaporation of the solvent. In our experience it is unnecessary—and this is a surprising feature of the invention—for this aqueous treatment liquor to contain any alkali or any detergent; it appears to be sufficient simply to use hot water. It is, however, desirable that the temperature of the water is such as brings about a sudden, vigorous, almost explosive evaporation of the residual solvent, namely a temperature of at least 73° C. in the case of trichloroethylene and at least 86° C. in the case of perchloroethylene.

The times of treatment with each liquor may be surprisingly short and the whole process is simple, safe and economical. The glass is not degraded, as is evidenced by the fact that any apparent loss of strength of the fabric resulting from the treatment can be restored by resizing the material with, for example, a light mineral oil. Moreover, adhesion of the resin is satisfactory and the strength characteristics of the finished laminates made with various types of resins are fully up to the accepted standard.

It is possible successfully to work in accordance with the broadest aspects of our process using solvent at ordinary temperature but the requisite time of treatment is then undesirably prolonged. Preferably the solvent is used substantially at its boiling point, and in the preferred form of the process the material is treated in a system adapted continuously to perform both the solvent extraction of the fabric and the rectification of the used solvent. In the preferred procedure woven glass fabric, for instance, is passed continuously at open width through a treatment chamber where it is immersed successively in a series of baths through which heated solvent passes counter-current to the fabric. These baths may conveniently be constructed by simply sub-dividing by means of baffles the bottom section of the treatment chamber, which section is provided with heating means at or near its base. Cooling coils are arranged in the upper part of the chamber to bring about condensation of the vapor, the condensate being collected and returned to the last of the extraction baths, from which the solvent continuously overflows successively into the baths that lie earlier in the series. In this way the system is self-cleaning; the soluble material extracted from the fabric accumulates in the solvent of the first bath in the series, the overflow from which passes to a rectifying unit where most of the solvent is distilled off, the vapors being condensed and returned again to the last bath of the series. Before leaving the chamber the extracted fabric preferably passes between nip rolls which serve to express the bulk of the solvent and it then passes on to receive the hot water treatment.

This may if desired be successfully carried out in any simple vessel such as a jig, but such procedure is preferably avoided as it would normally involve free evaporation and loss of solvent which is both uneconomic and hazardous to health. In the preferred procedure the fabric passes from the extraction chamber directly into a flash-off chamber where it again passes through a series of baths containing the heated extraction liquid (water) which moves on the cascade principle counter-current to the fabric. The hot water serves both to complete the evaporation of the solvent and to remove various constituents of the size (for instance, starchy materials) that have not been extracted by the solvent and that are water-soluble or degraded and solubilised by hot water. Here again cooling coils and collectors are provided near the top of the chamber. The vapors condensed contain both water and the solvent, usually as the azeotropic mixture; the condensate readily separates into two layers and so the solvent can be recovered and returned to the system. The water is therefore maintained above the boiling point of the particular solvent/water azeotrope in question, i.e. 73° C. in the case of trichloroethylene and 86° C. in the case of perchloroethylene; preferably the water is maintained nearly at the boil in either case.

Working in the manner just described the requisite times of treatment both with solvent and with water can be very brief, for instance as little as 10–20 seconds. However, the process is exceedingly flexible and no damage is done to the material if other forms of apparatus are used and the time of treatment with solvent or with water or with both is greatly extended, for instance to as much as half an hour. If desired, the flash-off treatment can be of such duration that it not only removes the residual solvent but also such constituents of the size as remain unextracted at this point and are water-soluble or degraded and solubilised by hot water. Alternatively, perhaps, for instance, to secure maximum output for a given size of plant, the hot water treatment can be applied in two stages, the first being carried out in the flash-off chamber where the time of treatment may be kept at the minimum needed to evaporate off residual solvent and the second carried out in a simple open vessel where the removal of the remaining starchy and other contaminants is completed; for this last purpose nothing more is needed than a simple hot water rinse and a conventional open width continuous washing machine can conveniently be used.

The minimum treatment times are obviously attained by using both the solvent and also the water at or near the boil—and this of course obtains whether the water treatment is applied in a single stage (as a dual purpose flash-off) or in two separate stages of flash-off and rinsing. Clearly if for any reason it is desired to work with cooler liquids, then the treatment times must be appropriately increased. It is undoubtedly advantageous to employ flash evaporation to remove the solvent and to use boiling water for any subsequent rinsing and in the preferred form of our process we find appropriate times to be: solvent extraction 10 to 60 seconds, flash-off 15 to 40 seconds and then a subsequent rinse at the boil in a 3-compartment open width continuous washing machine. On the other hand, a useful degree of size removal can be obtained by using a current of air or other inert gas (preferably warm air) to bring about evaporation of the solvent, but in such a case a more intensive final hot water treatment is required. Clearly it is not possible to specify the minimum times and temperatures that are needed for the hot water treatment because the times vary with the temperature (being shorter at higher temperatures) and they are also dependent on the efficiency of the rinsing action, being shorter in conditions where there is more intimate and more rapidly changing contact between the fabric and the rinsing water. However, the determination of appropriate times and temperatures is well within the capacity of the skilled operator familiar with textile treatment processes.

The process is conveniently illustrated by the following examples.

*Example 1*

This relates to the continuous treatment in open width of two types of woven glass fabric, one containing initially 1.43% of size and the other, a coarser fabric, containing 1.49%. Each fabric was passed, at open width and at a speed of 8 yards per minute through a chamber containing a series of three baths through which trichloroethylene held at its boiling point moved counter-current to the cloth, the liquor overflowing from each bath to that preceding it in the series, and that from the first bath (that into which the fabric enters) being passed to a recovery unit where it is distilled and whence it is returned to provide clean solvent for the last bath of the series. The total time of immersion in trichloroethylene of any given portion of cloth was 27 seconds. The cloth then passed between nip rolls to remove much of the entrained solvent and then into a "flash-off" chamber where it was plunged into water held at 95° C. The solvent thus evaporated was recovered and re-used in the extraction chamber. The time of immersion of any given portion of the cloth in the hot water was 36 seconds. The cloth was subsequently rinsed in cold water to complete the removal of starchy and other contaminants loosened by the hot water treatment and was then dried.

The amount of size contained in the fabrics before and after treatment was estimated by determining the percentage loss in weight on heating a sample to 600° C. for 10 minutes as described in Ministry of Supply Specification DTD.979; the figures were:

|  | Percentage of size | |
|---|---|---|
|  | Before treatment | After treatment |
| Finer fabric | 1.43 | 0.12 |
| Coarser fabric | 1.49 | 0.14 |

The loss in tensile strength of the fabrics resulting from the treatment was about 52% which appears to be solely due to the elimination of the lubricant since it could be restored by re-oiling the fabric with a light mineral oil. It thus appears that the fibres have not been in any way degraded by the desizing treatment.

*Example 2*

Proceeding in the manner described in Example 1 but treating eight other different types and constructions of woven glass fabric all containing initially approximately 1.5% of size, and using the same times and temperatures as before except that the final rinsing was carried out with boiling water, the following figures were obtained for the percentage of organic matter remaining in the fabrics after treatment.

| Fabric | Percent |
|---|---|
| Fabric No. 1 | 0.10 |
| Fabric No. 2 | 0.10 |
| Fabric No. 3 | 0.08 |
| Fabric No. 4 | 0.09 |
| Fabric No. 5 | 0.10 |
| Fabric No. 6 | 0.07 |
| Fabric No. 7 | 0.10 |
| Fabric No. 8 | 0.10 |

The simple solvent extraction and hot water treatment described above is normally fully adequate to desize glass fabric. However, the sizes used vary with the source of the glass fibre from which the fabric has been made, some sizes being particularly intractable and in some few such cases it may be advantageous finally to subject the fabric to a very rapid heat treatment, for instance, by passing it rapidly over a conventional gas-jet singeing machine. Equally an enzyme desizing procedure may be incorporated as an additional auxiliary treatment; for instance the fabric leaving the flash-off chamber may be treated batchwise on a jig with a conventional enzyme desizing bath, for example an aqueous solution of a malt extract, and then rinsed with hot water and dried, or it may be treated in a fully continuous manner by running through the enzyme bath, steaming, rinsing and drying. Yet again a semi-continuous process may be used in which the fabric is run through the enzyme solution, batched up on a roll for a period and then rinsed off and dried.

What we claim is:

1. A process for the removal of size from sized glass fiber textile material which comprises contacting said glass fiber textile material with a liquid organic solvent medium consisting essentially of a member of the group consisting of trichloroethylene and perchloroethylene and then contacting said material with hot water, whereby said size is removed.

2. A process for the removal of size from sized glass fiber textile materials as set forth in claim 1 in which the time of contact of the glass fiber textile material with said organic solvent medium is not more than about 30 minutes.

3. A process for the removal of size from sized glass fiber textile material as set forth in claim 1 in which the temperature of the organic solvent medium is about the boiling point and the time of contact of glass fiber textile material with said organic solvent medium is about 10 to about 60 seconds.

4. A process for the removal of size from sized glass fibers as set forth in claim 1 wherein the sized glass fiber textile material is contacted with the organic solvent medium by immersion in a body of liquid organic solvent medium.

5. A process for the removal of size from sized glass fiber textile material as set forth in claim 1 in which said material is passed directly from contact with said liquid organic solvent medium into said hot water which is held at a temperature of at least 73° C. in the case of trichloroethylene and 86° C. in the case of perchloroethylene.

6. A process for the removal of size from sized glass fiber textile material as set forth in claim 5 in which said hot water is held at a temperature of at least 95° C.

7. A process for the removal of size from sized glass fiber textile material as set forth in claim 1 in which subsequent to contact with said liquid organic solvent medium and prior to contact with hot water, excess solvent on said materials is removed.

8. A process for the removal of size from sized glass fiber textile material as set forth in claim 7 in which subsequent to contact with said liquid organic solvent medium and prior to contact with said water, the solvent is substantially removed from said material by evaporation in a stream of gas.

9. A process for the removal of size from sized glass fiber textile material which comprises contacting said fiber glass textile material with a liquid organic solvent medium consisting essentially of a member of the group consisting of trichloroethylene and perchloroethylene, at about the boiling point of said solvent medium for a period from about 10 to 60 seconds, then contacting said materials with hot water held at a temperature of at least 73° C. in the case of trichloroethylene and at least 86° C. in the case of perchloroethylene for a period of about 15 to 40 seconds, and then further contacting said material with hot water to remove residual remaining water-soluble size constituents.

References Cited in the file of this patent

UNITED STATES PATENTS

| | | |
|---|---|---|
| 1,375,663 | Ainsworth | Apr. 26, 1921 |
| 2,000,506 | Bromfield | May 7, 1935 |
| 2,134,602 | Cohen | Oct. 25, 1938 |
| 2,194,565 | Moss | Mar. 26, 1940 |
| 2,297,135 | Davis | Sept. 29, 1942 |
| 2,461,841 | Nordberg | Feb. 15, 1949 |
| 2,607,359 | Oesting | Aug. 19, 1952 |
| 2,666,720 | Balz | Jan. 19, 1954 |
| 2,689,198 | Judd | Sept. 14, 1954 |

FOREIGN PATENTS

| | | |
|---|---|---|
| 744,424 | Great Britain | Feb. 8, 1956 |